Nov. 25, 1941.                S. D. SCHELL                2,263,860
              AUTOMOBILE VENTILATOR WINDOW RAIN DEFLECTOR
                          Filed Nov. 30, 1940
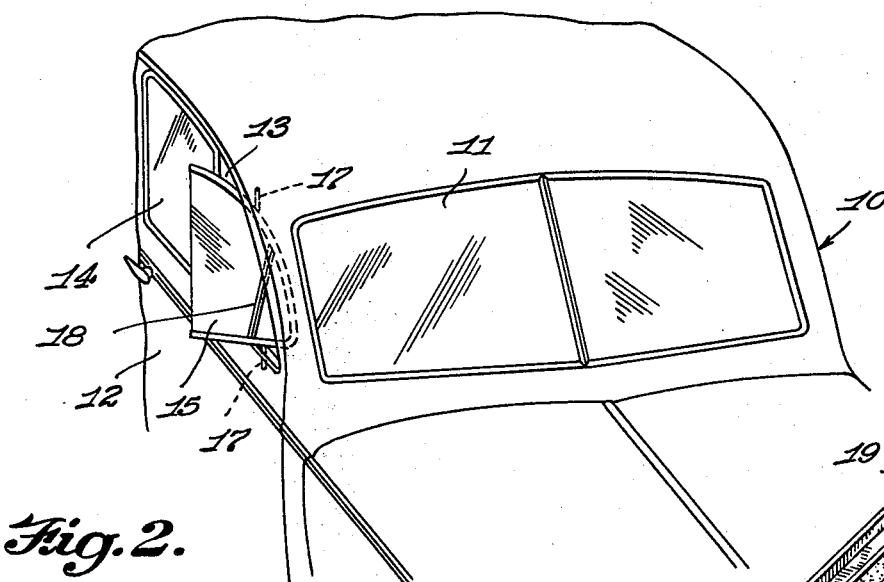
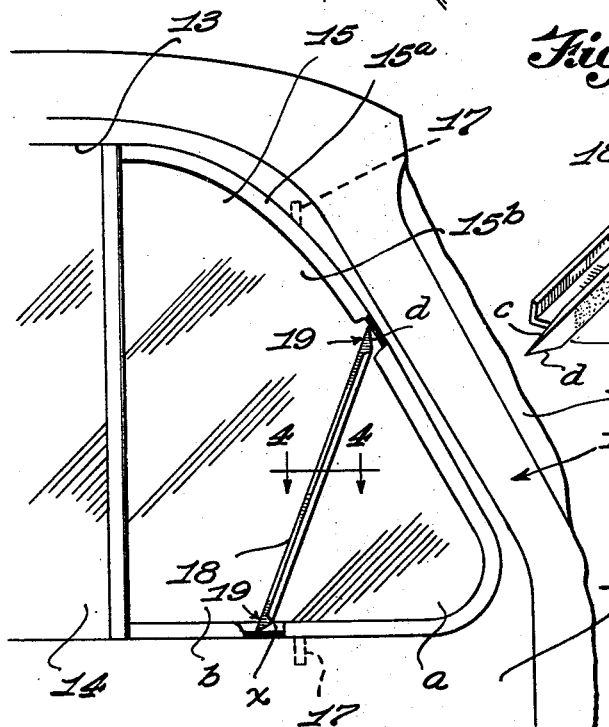
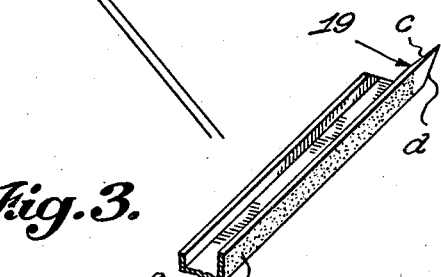
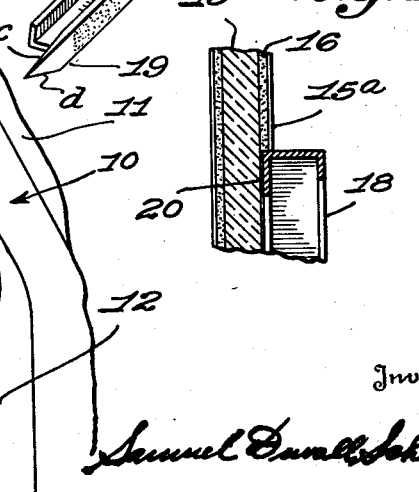
Inventor
Samuel Durrell Schell
By Patented Nov. 25, 1941

2,263,860

UNITED STATES PATENT OFFICE 2,263,860

AUTOMOBILE VENTILATOR WINDOW RAIN DEFLECTOR

Samuel Duvall Schell, Frederick, Md.

Application November 30, 1940, Serial No. 368,049

4 Claims. (Cl. 296—44)

The present invention relates to a rain deflector attachment for the, so-called, ventilating windows of vehicles.

It is now common practice to employ on vehicles, particularly automobiles, in addition to the ordinary windows that may be raised and lowered, so-called ventilating windows which are usually mounted on vertical pivots in the window openings of a vehicle and so arranged that, when opened, the forward portion of the ventilating window extends within the vehicle while the rearward portion projects outwardly, thereby forming an air deflector. By regulating the degree of angularity of the open position of such window, an air circulation in varying degrees may be produced within the vehicle while reducing or eliminating strong air draft which is normally experienced when ordinary slide windows are opened.

These air ventilating windows are very useful and desirable, but have the disadvantage, when traveling in the rain with the window opened to a degree which will allow air circulation or ventilation, that the rain, striking the portion of the window extending angularly outward from the car body, is caused by certain of the deflected air currents to flow toward the forward end of the ventilating window which, by reason of its angular position, extends within the car body. This accumulation of water drops within the car body and wets the upholstery or flooring and often fine clothing of the occupants of the car.

It is recognized that within practical limits, it is impossible to provide at all times against the admission of rain water into the vehicle body when the ventilation windows are opened and particularly when the rain is being driven by wind against a side of the vehicle at substantially right-angles thereto. In such extreme cases it would be necessary to keep the windows on that side of the vehicle closed in all events. But, it is possible to provide means which will enable the ventilating windows to remain open in most instances while driving a vehicle in the rain and to prevent the objectionable entry of the rain into the vehicle.

The object of the present invention, therefore, is the provision of a very simple and economical device which may be permanently or removably applied to the ventilating windows of a vehicle to prevent rain water and like, which impinges and accumulates thereon, from passing into the body of the vehicle, particularly while said windows are opened and the vehicle is in motion.

The object of the invention is carried out by placing a strip of suitable material on the outer surface of the ventilating window and have it extend at a vertical inclination from a lower edge portion of the window, lying outside of the vehicle body when the window is opened, toward a forward edge of the window, this strip of material also extending laterally of the window pane to stop the inward movement of the accumulated moisture on the outwardly extending portion of an opened ventilating window and direct or deflect its flow so that it will drop outside the vehicle body. It is preferred to have this deflector strip of material formed to provide a directing channel or path which will prevent accumulated moisture from passing around the longitudinal edges of the same.

With the above and other objects in view, which will appear as the specification proceeds, the invention resides in the sundry details of construction, combination and arrangement of parts hereinafter more fully described and pointed out in the appended claims.

In the drawing which discloses the preferred embodiment of the invention, as at present devised—

Figure 1 is a fragmentary perspective view of the body of an automobile equipped with a ventilating window having the invention applied thereto, the window being shown in one of its opened positions;

Figure 2 is a fragmentary elevation of an automobile body equipped with a ventilating window and showing the invention applied thereto, the window being in closed position and parts being broken away to illustrate the details of construction;

Figure 3 is a perspective view of one form of the rain deflecting attachment of the present invention; and Figure 4 is a transverse sectional view taken substantially on line 4—4 of Figure 2.

Referring in detail to the drawing, wherein like characters denote similar and like parts throughout the several views, 10 denotes an automobile body having a windshield portion 11 and sidedoor 12 provided with a window opening 13. The rear portion of the window opening 13 is equipped with the usual sliding window pane 14 and, in its forward portion, with the, so-called, ventilating window 15. The ventilating window 15 is usually provided with a sash or supporting border frame 15a channel shaped in cross section and in which channel of the sash is disposed a glass window pane 15b so as to embrace the top, bottom and forward edge of the pane. The sash 15a may be of any shape or design which conforms with the general contour of the window opening portion in which it is disposed. In order to cushion the glass pane 15b, there is interposed between it and the inner surfaces of channel sash 15a a lining or padding 16 which is co-extensive with the channel surface. This type of ventilating window 15 is arranged to be moved so that its forward end portion a will extend within the vehicle body and its rear end b will extend outwardly from the body when moved from closed position, as shown in Figure 1; and, to this end, usually the sash 15a is pivotally mounted to the window opening frame about a substantially vertical axis, as at 17, intermediate its front and rear edges and suitable operating means, not shown, is employed to effect the opening and closing of the window 15. All of the construction just described is more or less conventional and is illustrated therein for the convenient purpose of an example of the type of ventilating window to which the invention is adaptable.

The rain deflecting device 18 of the present invention comprises, in its simplest embodiment, a strip of material to be laid across and in contact with the outer face of the window pane 15b from a point slightly to the rear of the lower window pivot 17 and extending in an upwardly inclined or oblique direction to the forward edge of the window sash 15a, this strip projecting laterally from the pane surface sufficiently to prevent the rain, which impinges against and accumulates upon its outwardly extending portion b when the window is open, from moving forwardly of the window pane under the influence of air currents so as to drop within the vehicle body. This deflecting strip 18 is formed to direct or guide, when applied to the window pane 15b, the water which engages it to flow downwardly to the point x where it is discharged outside of the vehicle body.

In the more specific embodiment of this invention, the deflector 18 may consist of a substantially straight elongated strip, preferably (but not necessarily as above stated) channel shaped in cross-section as shown in Fig. 3, of any suitable material such, for instance, as metal, glass, Celluloid, compressed fibre, plastic material or the like, finished in any desired manner that will enhance its attractiveness. It is found that a deflecting strip 18 about seven inches long, more or less, and between ⅛ and ⅜ of an inch wide functions very effectively, especially, when the deflector is channel shaped as just mentioned. The channel formation (either square, V-shape or semi-circular) of the deflecting strip shields the water flowing downwardly therein from strong up-flowing air drafts.

In order to facilitate the attachment of the deflector to the ventilating window, the ends of one of the side walls of the channeled deflector project for a distance outwardly, as a continuation of said side wall, to form prongs or fingers 19, which may be inserted into the channeled sash 15a with ease between the lining or padding 16 and the window pane 15b. These prongs or fingers 19 may be tapered on the channel side, as at c, toward their extremities which latter may also be cut obliquely to form a tapered pointed edge d for allowing their easy insertion in place as just described; or by the use of an implement, such as a pocket knife blade, a slight opening may be initiated between the padding 16 and the window pane to further facilitate the insertion of the prongs 19. The outer face of said side of the deflector carrying the prongs 19 may have applied thereto a suitable adhesive 20, which may be applied if desired to said surface during manufacture, for attaching the deflector to the window pane and for assuring a water tight contact between said surface and said pane but this adhesive is not necessary if the contacting surfaces are substantially smooth.

One of these deflectors 18 may be applied to each ventilating window on either the right or left hand side of the vehicle for, as will be obvious, there is no necessity of especially providing one group for the right side and another group for the left side.

It will be apparent that the results aimed at by the present invention are accomplished without the employment of a cumbersome and awkward structure but by a very simple means applied direct to the surface of the window pane and so located thereon as will not interrupt or obstruct the vision of the driver and occupant of the vehicle. Furthermore, the deflector of the present invention will not detract from the appearance of the vehicle, particularly if constructed of transparent material or chrome plated metal.

Having thus described the invention and the manner in which the same is to be performed, it is to be understood that the invention is not to be limited to the exact form herein described as various changes and modifications may be made which fall within the terms of the appended claims.

That which is claimed is:

1. In combination with a ventilating window of vehicles wherein said window comprises a pane and a bordering frame mounted to open with its forward portion extending inwardly of the vehicle and its rearward portion extending outwardly of the vehicle, of a rain deflector mounted on the outer surface of said window pane and comprising a strip of material extending forwardly in a substantially straight line vertically inclined direction from the lower edge of said window projecting outwardly of the car body to a substantially diagonally opposite edge of said window extending within the car body when the window is open, said strip of material extending laterally outward from the surface of said window to form a deflecting surface for directing the movement of water flowing toward the same and engaging thereagainst, and prongs at the ends of said strip and forming a substantial continuation thereof inserted between said frame and pane to position and maintain the deflector applied to the pane.

2. A rain deflector for a ventilating window of vehicle bodies, wherein said window comprises a pane and a bordering supporting frame mounted to be opened with its forward portion extending inwardly of the vehicle and its rearward portion extending outwardly of the vehicle; said deflector comprising a strip of material substantially straight having one of its outer side faces flat to lie against the pane of said window in contact therewith and formed to project angularly outward from the surface of the pane to provide a guide or channel for water on its upper face, and prongs at the end portions of said strip insertable between said frame and pane for attaching the deflector to said window so that said deflector will extend forwardly in a substantially diagonal direction from the lower edge of the window pane to a substantially diagonally opposite edge thereof when applied to the window.

3. A rain deflector for a ventilating window of vehicle bodies, wherein the window pane is mounted in a supporting bordering frame and to be opened with its forward portion extending inwardly of the vehicle and its rearward portion extending outwardly of the vehicle; said deflector comprising an elongated substantially straight strip of material substantially channel shaped in cross section and having the outer face of one of its side walls adapted to lie flat against the pane of said window in contact therewith, a projecting prong at each end respectively of said side wall and forming a continuation thereof for insertion between the window frame and pane to attach the deflector to the edge portion of said window so that said deflector will extend forwardly in a substantially diagonal direction from a lower edge of the window pane to a substantially diagonally opposite edge thereof when applied to the window.

4. A rain deflector as in claim 3 wherein each prong has one side edge longer than the other and has its side surface, corresponding to the bottom face of the channel, tapered toward its extremity.

SAMUEL DUVALL SCHELL.